United States Patent
Chen et al.

(10) Patent No.: US 11,350,264 B2
(45) Date of Patent: May 31, 2022

(54) METHOD AND APPARATUS FOR ESTABLISHING DEVICE CONNECTION

(71) Applicant: Samsung Electronics Co., Ltd., Suwon-si (KR)

(72) Inventors: Xunmin Chen, Nanjing (CN); Peng Yin, Nanjing (CN); Jianrong Hu, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 16/520,557

(22) Filed: Jul. 24, 2019

(65) Prior Publication Data
US 2020/0037144 A1 Jan. 30, 2020

(30) Foreign Application Priority Data

Jul. 25, 2018 (CN) .......................... 201810824343.8
Jun. 27, 2019 (KR) ........................ 10-2019-0077307

(51) Int. Cl.
*H04W 8/00* (2009.01)
*G06K 9/62* (2022.01)
(Continued)

(52) U.S. Cl.
CPC .......... *H04W 8/005* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS

2011/0301845 A1* 12/2011 Harada ............... B60R 21/0134
                                                          701/301
2012/0274782 A1* 11/2012 Kitaguchi .............. G06K 9/209
                                                          348/169
(Continued)

FOREIGN PATENT DOCUMENTS

CN         101794381 A      8/2010
CN         102301405 A     12/2011
(Continued)

OTHER PUBLICATIONS

International Search Report dated Oct. 25, 2019, issued in International Patent Application No. PCT/KR2019/009198.
(Continued)

*Primary Examiner* — Gregory B Sefcheck
*Assistant Examiner* — Suk Jin Kang
(74) *Attorney, Agent, or Firm* — Jefferson IP Law, LLP

(57) ABSTRACT

A method and apparatus for establishing a device connection applied to a first device with a camera are provided. The method includes acquiring an image of a second device by the first device through the camera, recognizing the type of the second device through the acquired image of the second device, acquiring a device list corresponding to the type of the second device through an IoT server, and identifying the second device in the device list, acquiring a unique identifier of the second device in the current IoT environment, and using the unique identifier of the second device to initiate a connection request to the second device to establish a connection with the second device. The method may automatically establish a connection between devices with less operation of the devices.

18 Claims, 13 Drawing Sheets

(51) Int. Cl.
*H04L 61/5038* (2022.01)
*G06F 3/0482* (2013.01)
*H04L 41/22* (2022.01)
*H04L 67/125* (2022.01)
*G06F 3/0488* (2022.01)
*H04W 76/10* (2018.01)

(52) U.S. Cl.
CPC ......... *G06K 9/6217* (2013.01); *G06K 9/6253* (2013.01); *H04L 41/22* (2013.01); *H04L 61/2038* (2013.01); *H04L 67/125* (2013.01); *H04W 76/10* (2018.02)

(56) References Cited

U.S. PATENT DOCUMENTS

| | | | |
|---|---|---|---|
| 2013/0223279 A1 | 8/2013 | Tinnakornsrisuphap et al. | |
| 2014/0310420 A1* | 10/2014 | Kuo | H04N 21/23418 709/227 |
| 2014/0327786 A1* | 11/2014 | Grob | H04N 1/0044 348/207.1 |
| 2015/0029880 A1* | 1/2015 | Burns | G01S 11/16 370/252 |
| 2015/0036881 A1* | 2/2015 | Sharma | G06F 16/50 382/103 |
| 2015/0103171 A1* | 4/2015 | Cho | B60R 16/00 348/148 |
| 2015/0130957 A1* | 5/2015 | Berelejis | H04L 67/12 348/211.1 |
| 2015/0133051 A1* | 5/2015 | Jamal-Syed | H04W 4/21 455/41.2 |
| 2015/0138376 A1* | 5/2015 | Grob | H04N 1/00127 348/207.1 |
| 2015/0358777 A1* | 12/2015 | Gupta | H04L 67/18 370/254 |
| 2016/0012431 A1* | 1/2016 | Proctor, Jr. | H04L 69/18 705/44 |
| 2016/0021692 A1* | 1/2016 | Saito | H04W 4/80 370/329 |
| 2016/0112374 A1* | 4/2016 | Branca | H04L 63/0263 726/1 |
| 2016/0217617 A1* | 7/2016 | Barribeau | G06F 3/04883 |
| 2016/0249394 A1* | 8/2016 | Debates | G06K 9/4642 |
| 2016/0292507 A1* | 10/2016 | Ghoson | G06K 9/22 |
| 2016/0299735 A1* | 10/2016 | Oztaskent | G06K 9/18 |
| 2016/0313907 A1* | 10/2016 | Sasaki | H05B 47/175 |
| 2017/0155703 A1* | 6/2017 | Hao | H04L 67/12 |
| 2017/0195294 A1* | 7/2017 | Branca | H04L 63/102 |
| 2017/0195424 A1* | 7/2017 | Nasir | H04L 67/36 |
| 2017/0322759 A1* | 11/2017 | Tokuchi | G06F 3/14 |
| 2018/0054487 A1* | 2/2018 | Hebsur | H04L 67/12 |
| 2019/0018852 A1* | 1/2019 | Oh | H04W 4/70 |
| 2019/0037624 A1* | 1/2019 | Tokuchi | H04W 4/80 |
| 2019/0090295 A1* | 3/2019 | Saito | H04M 1/72415 |
| 2019/0114061 A1* | 4/2019 | Daniels | G06F 3/04815 |
| 2019/0156105 A1* | 5/2019 | Kim | G06F 3/04817 |
| 2019/0171407 A1* | 6/2019 | Oztaskent | G06F 3/0482 |
| 2019/0235641 A1* | 8/2019 | Goldberg | G08C 23/04 |
| 2019/0289142 A1* | 9/2019 | Takeshita | H04L 67/12 |
| 2019/0311513 A1* | 10/2019 | Han | H04L 67/306 |
| 2019/0391716 A1* | 12/2019 | Badr | G06K 9/00671 |
| 2020/0177792 A1* | 6/2020 | Pan | H04L 61/1541 |
| 2020/0177948 A1* | 6/2020 | Kim | H04N 21/4312 |
| 2020/0234077 A1* | 7/2020 | Wang | G06K 9/6202 |
| 2020/0319765 A1* | 10/2020 | Badr | G08C 17/02 |
| 2020/0326903 A1* | 10/2020 | Oztaskent | G06F 3/0482 |
| 2020/0342676 A1* | 10/2020 | Koohmarey | G06K 9/00221 |
| 2021/0144789 A1* | 5/2021 | Tokuchi | H04W 4/80 |

FOREIGN PATENT DOCUMENTS

| | | |
|---|---|---|
| CN | 102377621 A | 3/2012 |
| CN | 102760227 A | 10/2012 |
| CN | 102831386 A | 12/2012 |
| CN | 103108167 A | 5/2013 |
| CN | 104063040 A | 9/2014 |
| CN | 104581038 A | 4/2015 |
| CN | 104598589 A | 5/2015 |
| CN | 104616023 A | 5/2015 |
| CN | 105306450 A | 2/2016 |
| EP | 3 168 730 A2 | 5/2017 |
| KR | 10-2016-0066292 A | 6/2016 |
| KR | 10-2017-0016744 A | 2/2017 |
| KR | 10-2017-0040492 A | 4/2017 |
| WO | 2013/154476 A1 | 10/2013 |

OTHER PUBLICATIONS

European Search Report dated Jul. 9, 2021, issued in European Application No. 19840103.6.

* cited by examiner

METHOD AND APPARATUS FOR ESTABLISHING DEVICE CONNECTION

CROSS-REFERENCE TO RELATED APPLICATION(S)

This application is based on and claims priority under 35 U.S.C. § 119(a) of a Chinese patent application number 201810824343.8, filed on Jul. 25, 2018, in the State Intellectual Property Office, and claims priority under 35 U.S.C. § 119(a) of a Korean patent application number 10-2019-0077307, filed on Jun. 27, 2019, in the Korean Intellectual Property Office, the disclosures of each of which are incorporated by reference herein in their entirety.

BACKGROUND

1. Field

The disclosure relates to the technical field of communication. Particularly, the disclosure relates to a method and apparatus for establishing a device connection.

2. Description of the Related Art

In the age of popularization of smart devices, with the wave of internet of things (IoT), there are more and more application scenarios of interconnection between devices. Accordingly, the requirements for intellectualization of devices are getting higher, and the requirements for the convenience of application scenarios are getting higher.

In an IoT environment, there may be multiple connectable smart devices. How to quickly distinguish a target smart device and establish a connection is implemented in the existing implementations as follows.

A current user needs to open the Bluetooth or a wireless network first, search for a device list in the current IoT environment, select the target device in the list, try to establish a connection, and enter a connection password until the connection is successfully established.

Such a process to establish a connection obviously does not meet the requirements for the convenience of smart devices.

And for device without input/output (IO) accessories, such as a keyboard, a touch screen, a mouse, etc., or without a display screen, or with a small-size display screen, the connections with other devices cannot be established.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for establishing a device connection, which can automatically establish a connection between devices with less operation on the devices.

In order to solve the above technical problems, the technical solution of the disclosure is implemented as follows.

Additional aspects will be set forth in part in the description which follows and, in part, will be apparent from the description, or may be learned by practice of the presented embodiments.

In accordance with an aspect of the disclosure, a method for establishing device connections, applied to a first device with a camera is provided. The method includes acquiring an image of a second device by the first device through the camera, recognizing the type of the second device through the acquired image of the second device, acquiring a device list corresponding to the type of the second device through an Internet-of-things server, and identifying the second device in the device list, acquiring a unique identifier of the second device in the current Internet-of-things environment, and using the unique identifier of the second device to initiate a connection request to the second device to establish a connection with the second device.

In accordance with another aspect of the disclosure, a device for establishing a device connection applied to a first device is provided. The device includes a camera includes a first acquisition unit, a recognition unit, a second acquisition unit, a determination unit, a third acquisition unit, and a processing unit, in which the first acquisition unit is configured to acquire an image of the second device through the camera, the recognition unit is configured to recognize the type of the second device through the image of the second device acquired by the first acquisition unit, the second acquisition unit is configured to acquire, through an Internet-of-things server, a device list corresponding to the type of the second device recognized by the recognition unit, the determination unit is configured to identify the second device in the device list acquired by the second acquisition unit, the third acquisition unit is configured to acquire a unique identifier of the second device in the current Internet-of-things environment determined by the determination unit, and the processing unit is configured to use the unique identifier of the second device acquired by the third acquisition unit to initiate a connection request to the second device to establish a connection with the second device.

According to the above technical solution, in the disclosure, the first device captures, through the camera, and recognizes the device type of the second device to be connected, and acquires the device list corresponding to the type of the second device from the Internet-of-things server to determine the related information of the second device so as to establish a connection with the second device. Establishing a connection between devices with less operation on the devices can be implemented in this solution.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of various embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An embodiment of the disclosure provides a method for establishing a device connection which applied to a first device with a camera. In the method, the first device captures and recognizes the device type of a second device to be connected through the camera, and acquires a device list corresponding to the type of the second device from an internet of things (IoT) server to determine the related information of the second device so as to establish a connection with the second device. Automatically establishing a connection between devices in the case that the hardware requirements of the devices are not high can be implemented in this solution.

In the embodiment of the disclosure, the devices such as the first device, the second device and the like are not specifically referred to as a type of devices, but refer to any device in the current IoT environment.

In the embodiment of the disclosure, the first device is taken as a main body for controlling the connection establishment. The first device may be a mobile phone, an iPad®, glasses or the like; and the first device needs to have camera function, that is, with a camera.

The process of establishing a device connection in the embodiment of the disclosure will be described below in detail with reference to the accompanying drawings.

First Embodiment

In this embodiment, a process of one device establishing a connection with another device is taken as an example.

Figure 1:
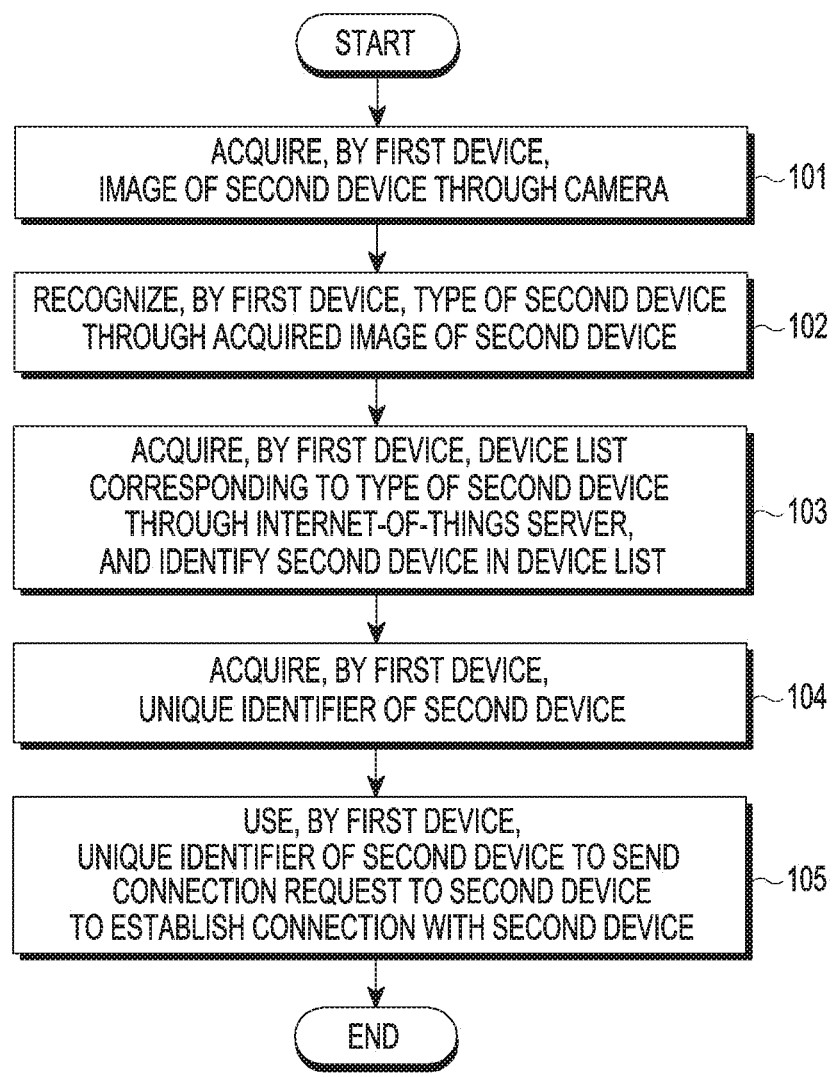
FIG. 1 is a flowchart of establishing a device connection according to an embodiment of the disclosure.

FIG. 1 is a flowchart of establishing a device connection in according to an embodiment of the disclosure.

Referring to FIG. 1, according to various embodiments of the disclosure, at operation 101, a first device 200 acquires an image of a second device 210 through a camera (e.g., a camera module).

According to various embodiments of the disclosure, after acquiring the image of the second device 210 through the camera, the first device 100 displays the image on a screen (e.g., a touch screen display). That is, after the first device captures the image of the second device, all the captured contents are displayed on the screen.

If the number of the displayed IoT devices is greater than 1, after an instruction input by a user to select any of the IoT devices is received, the selected IoT object is the target device to be recognized. A command for selecting any one device according to various embodiments of the disclosure may include various types of commands such as a touch (e.g., tap) gesture, a swipe gesture, a drag gesture, a hovering gesture, or a voice command.

According to various embodiments of the disclosure, when the target image is captured, multiple devices may be relatively close to each other, and the multiple devices may be captured at the same time. If the first device is moved or the user moves, there will be some inconvenience, or the second device 210 may not be accurately captured. In the disclosure, when this situation occurs, the user may manually select the target device, i.e., the second device, by touch, such that the first device 200 will know which device is to be recognized later. And if the first device 200 is a pair of glasses (e.g., Google glasses), instructions may be input through some virtual gestures or body movements.

According to various embodiments of the disclosure, at operation 102, the first device 200 recognizes a type of the second device 210 through the acquired image of the second device 210.

According to various embodiments of the disclosure, after operation 102 is performed, the first device 200 acquires a device list corresponding to the type of the second device 210 through the IoT server. After the device list is acquired, operation 103 is performed. And if the device list corresponding to the type of the second device 210 is not acquired through the IoT server, the IoT server is notified to establish a device list corresponding to the type of the second device 210, and add the feature information corresponding to the second device 210 in the established device list.

According to various embodiments of the disclosure, in the foregoing embodiment of the disclosure, notifying the second device 210 by the first device 200 to add the device list and the feature information may be implemented by connecting the first device 200 to the IoT server or may be implemented by notifying the IoT server to manually add the first device 200 at the IoT server. According to various embodiments of the disclosure, the implementation of adding a device list corresponding to one device type to the IoT server is not limited in the disclosure.

According to various embodiments of the disclosure, if the type of the second device 210 is recognized as a refrigerator and there is no device list corresponding to refrigerators, a device list of refrigerators is added to the IoT server. The function or operation of adding the device list of refrigerators may include, for example, assigning a unique identifier to the second device 210, and storing the brand of the device, the current state of the device (power-on, standby, contents being played, and the like), the name of the device, the model of the device, the surrounding environment of the device and the like. According to various embodiments of the disclosure, as for adding the feature information of the device, the feature information of the device may be added manually or by voice input, or may be added by recognizing the image of the second device 210 to acquire the feature information.

Figure 2:
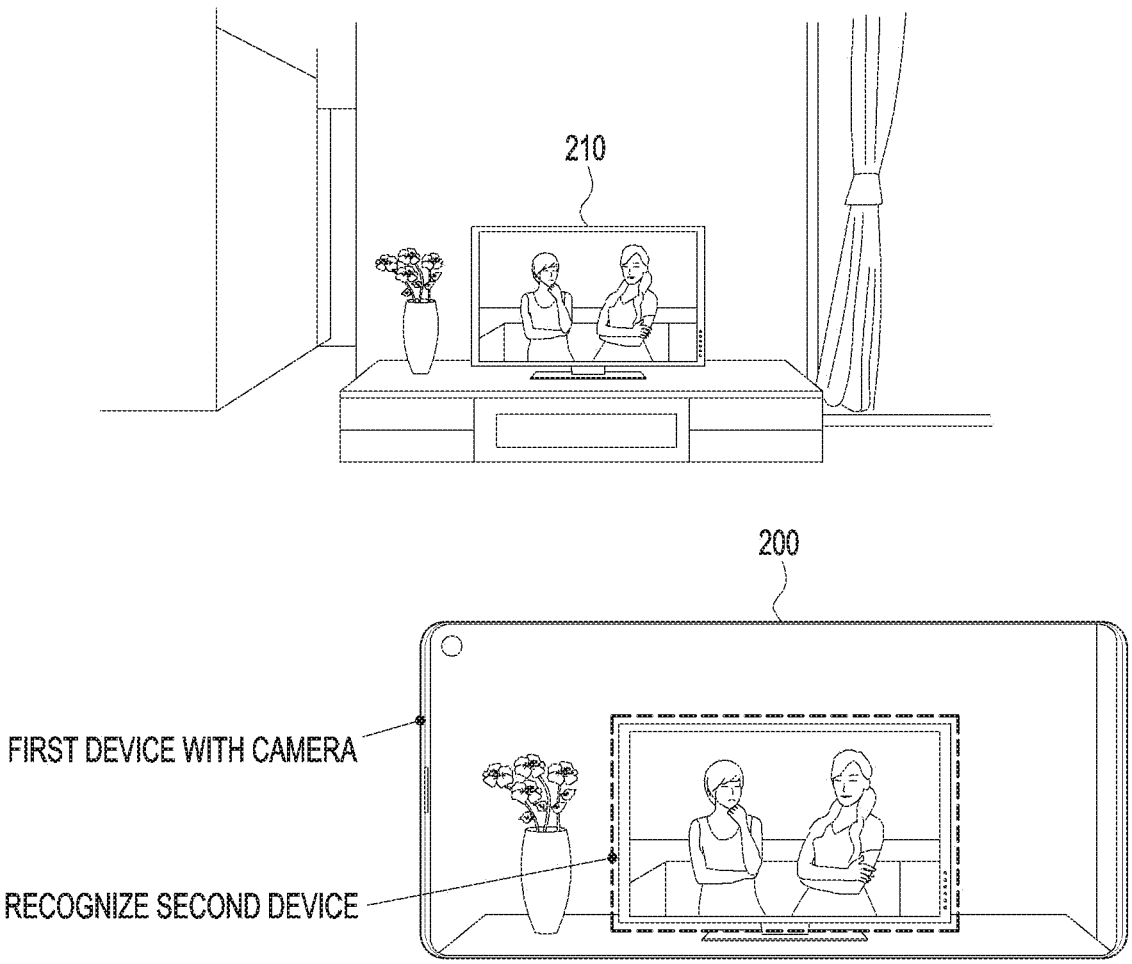
FIG. 2 is a diagram of a first device acquiring an image of a second device through a camera according to an embodiment of the disclosure.

FIG. 2 is a schematic diagram of a first device acquiring an image of a second device through a camera according to an embodiment of the disclosure.

Referring to FIG. 2, the example illustrates that the first device 200 is a mobile terminal and the second device 210 is a television set. In another implementation, the first device 200 may also be a pair of glasses with a camera.

In FIG. 2, the first device 200 captures an image of the second device 210 through the camera. The device type of the second device 210 is recognized in the back-end (e.g., a server), and the second device is further identified in the corresponding device list.

Referring to FIG. 2, after the second device 210 is identified, the information about the second device is identified and displayed on the captured image in a preset mode (e.g., in a form of a dashed box on the contour boundary of the second device). According to various embodiments of the disclosure, the information may be not displayed, and the second device is directly determined in the back-end.

According to various embodiments of the disclosure, at operation 103, the first device 200 acquires a device list corresponding to a type of the second device 210 through a server (e.g., the IoT server) and identifies the second device 210 in the device list.

According to various embodiments of the disclosure, there may be related information of multiple devices or related information of one device in the device list acquired in this operation. No matter how many devices have their related information presented, the feature information of the recognized device should match and identify the second device 210.

Before this operation is performed, the feature information of the second device 210 is recognized according to the acquired image of the second device 210, which may be specifically implemented by determining the feature information of the second device 210 based on preset recognition and some local pre-configuration. The method for recognizing the feature information of the second device 210 is not limited in the disclosure. The method may be implemented according to the existing implementation. And then, the second device 210 is determined in the device list corresponding to the type of the second device 210 acquired through the IoT server, which is described as below.

According to various embodiments of the disclosure, the feature information of the second device 210 is used to match with the feature information corresponding to each unique identifier in the device list. That is, the feature information corresponding to each unique identifier is matched. And if there is the feature information that matches the feature information of the second device 210, the device identified by the unique identifier corresponding to the matched feature information is determined as the second device 210.

According to various embodiments of the disclosure, for different types of devices, matching rules may be preset to determine whether the feature information matches, and the following rules may be followed but are not limited thereto.

According to various embodiments of the disclosure, each piece of feature information of any one device is separately matched separately, and a device of which the number of matched feature information reaches the preset number serves as a device which is matched with the feature information of the second device 210, and serves as the target device. And take a television set for example, the brand of the television set, the name of the television set, the signals of the television set, the power-on state of the television set, the environment surrounding the device (such as the color of the cabinet for television set, objects around the television set, etc.) are matched separately. And if the preset value is set to 3, the device with 3 or more matched feature information will serve as the target device, that is, the second device 210 to be determined.

According to various embodiments of the disclosure, if there are multiple corresponding devices with the number of matched feature information reaches the preset number of matched feature information, the device with the most matched feature information is selected as the target device; or the device of which the feature information matches certain preset feature information is determined as the target device.

According to various embodiments of the disclosure, if there is no feature information that matches the feature information of the second device 210, that is, the devices in the device list are the same type (e.g., the same refrigerator) as the second device 210 but are not the second device 210, none of the multiple refrigerators in the refrigerator list is the refrigerator indicated by the second device 210.

According to various embodiments of the disclosure, in this case, the first device 200 notifies the IoT server to assign a unique identifier to the second device 210 in the device list, and add the corresponding feature information.

According to various embodiments of the disclosure, in the specific implementation, the first device 200 may send the feature information of the second device 210 to the IoT server, and the IoT server may add the feature information of the second device 210 to the device list corresponding to the second device 210 and assign the unique identifier.

According to various embodiments of the disclosure, the IoT server may be only notified that the new device is not in the device list, and the related information may be directly (e.g., manually) added in the device list on the IoT server side.

According to various embodiments of the disclosure, at operation 104, the first device 200 acquires a unique identifier of the second device in the current IoT environment (e.g., from the IoT server).

According to various embodiments of the disclosure, at operation 105, the first device 200 uses the unique identifier of the second device 210 to transmit (e.g., initiate) a connection request to the second device 210 to establish a connection with the second device 210.

According to various embodiments of the disclosure, during the establishment of a connection, the first device 200 and the second device 210 negotiate and select an IoT protocol supported by the two devices, and establish a connection by interaction. In the specific implementation of the disclosure, once one of the devices determines the related information of the target device, the process of negotiating and establishing a connection is similar to the existing implementation, which will not be described here in detail.

According to various embodiments of the disclosure, in this embodiment, a device with a camera may automatically establish a connection with the target device. Manually searching all the IoT devices in the current environment and manually selecting the target device and establishing a connection are not needed in this embodiment.

Second Embodiment

This embodiment describes the process of controlling one device through another device after a connection has been established between the two devices.

Figure 3:
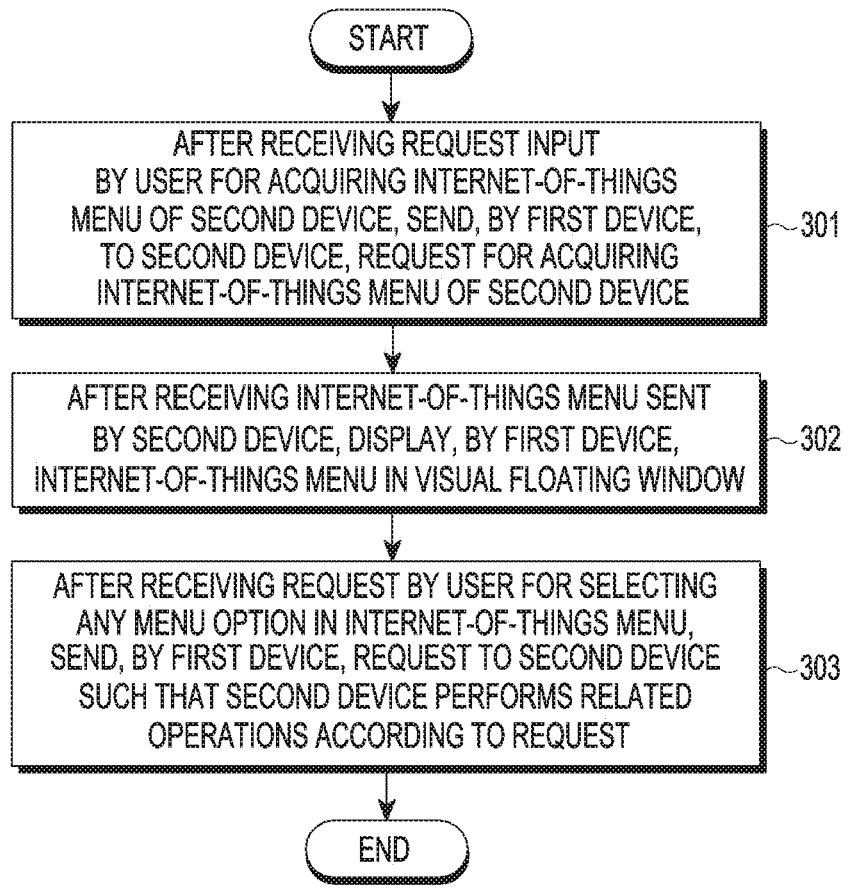
FIG. 3 is a flowchart of a first device controlling a second device through an internet of things (IoT) menu according to an embodiment of the disclosure.

FIG. 3 is a flowchart of a first device controlling a second device through an IoT menu according to an embodiment of the disclosure.

Referring to FIG. 3, at operation 301, after receiving a request input by a user for acquiring an IoT menu 500 of the second device 210, the first device 200 sends, to the second device 210, a request for acquiring the IoT menu of the second device 210.

According to various embodiments of the disclosure, the method for sending a request for acquiring the IoT menu 500 may be implemented by a menu request that is triggered by preconfigured related operations. For example, if the picture of the second device is touched by clicking or sliding on the screen of the first device, the first device receives the request for the IoT menu 500 input by the user.

Figure 4:
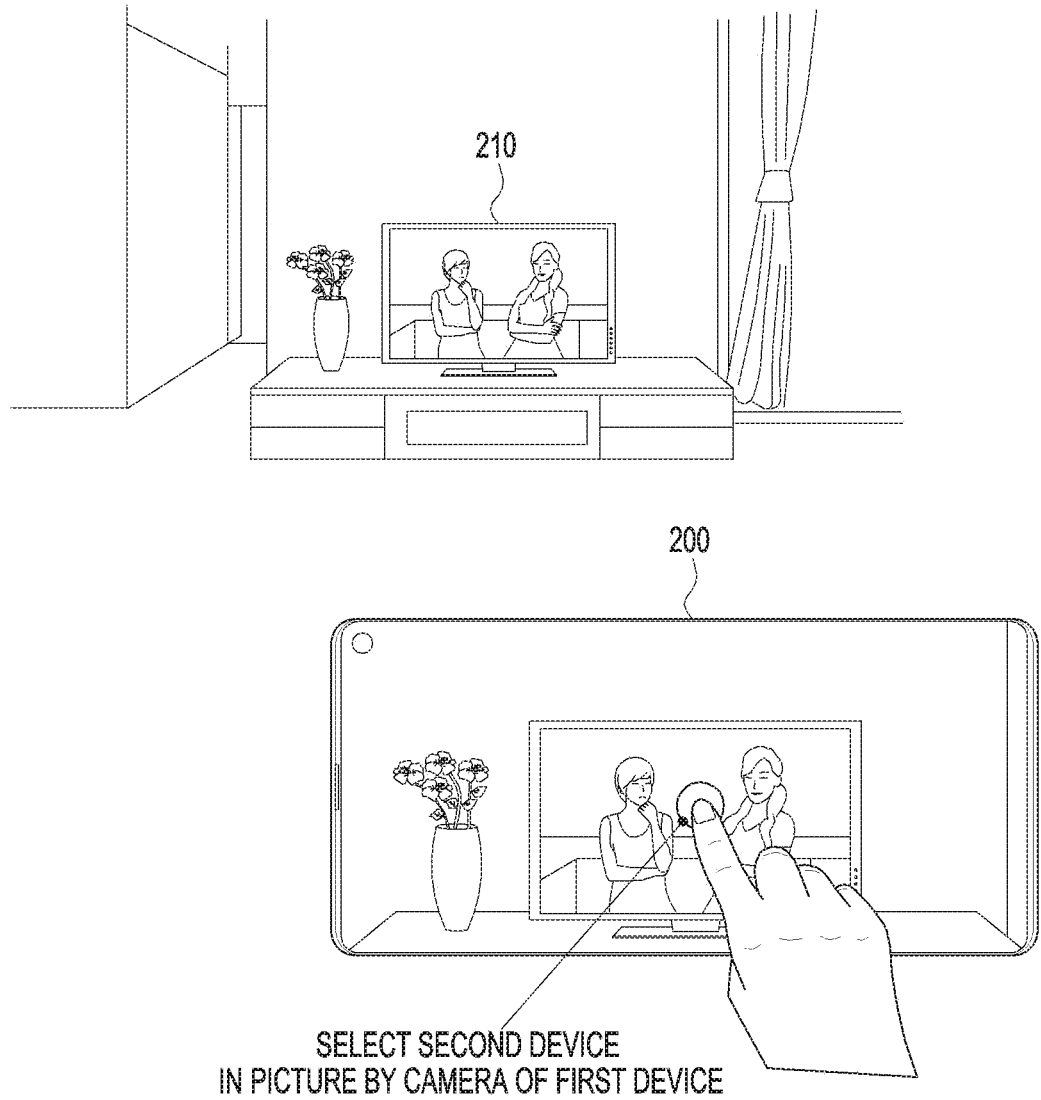
FIG. 4 is a diagram of initiating a request for an IoT menu by clicking according to an embodiment of the disclosure.

FIG. 4 is a diagram of initiating a request for an IoT menu by clicking according to an embodiment of the disclosure.

Referring to FIG. 4, to respond to a user's clicks to the image of the second device by a finger, at least one of the first device or the second device determines that a request is input by the user for acquiring an IoT menu 500 of the second device. Then a request for acquiring the IoT menu 500 of the second device is sent to the second device.

The IoT menu 500 herein may include a function menu of the second device. For example, the IoT menu 500 according to various embodiments of the disclosure may include at least one menu among a menu 501 for turning on/off power, menus 502 and 503 for controlling volume, menus 504 and 505 for switching channels, or a menu 506 for muting.

According to various embodiments of the disclosure, in the specific implementation, if the first device has a voice input function, the request may also be input by voice.

According to various embodiments of the disclosure, in response to a request for an IoT menu sent by the first device 200, the second device 210 sends the data related to the IoT menu to the first device 200.

According to various embodiments of the disclosure, at operation 302, after receiving an IoT menu sent by the second device 210, the first device 200 displays information about the IoT menu (e.g., a menu related to a volume control function, a menu related to channel switch function, a menu related to a device power on/off function, or a menu related to a muting function) in a visual floating window.

Figure 5:
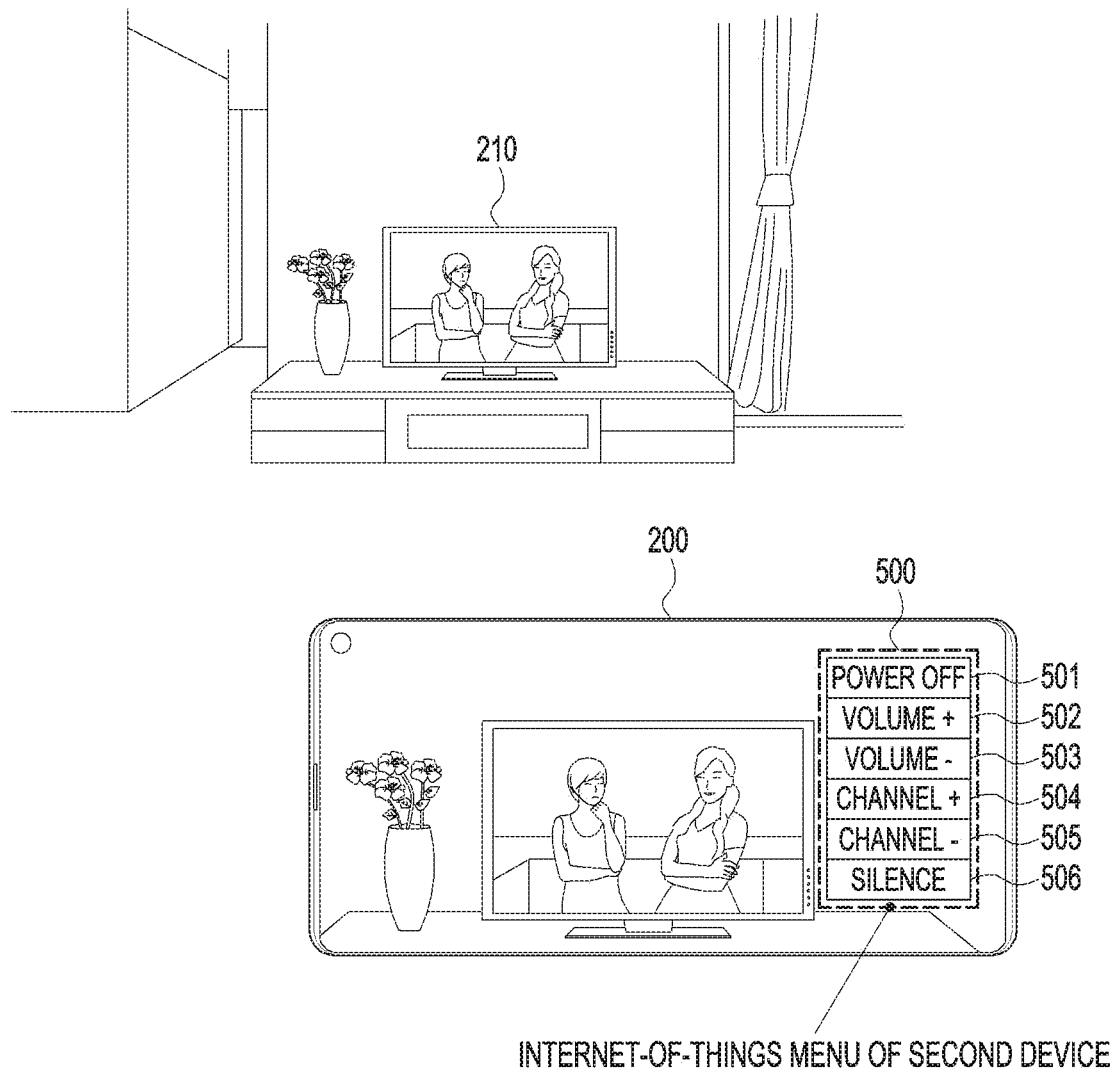
FIG. 5 is a diagram of displaying an IoT menu of a second device on a visual floating window on a first device according to an embodiment of the disclosure.

FIG. 5 is a diagram of displaying an IoT menu of a second device on a visual floating window on a first device according to an embodiment of the disclosure.

Referring to FIG. 5, according to various embodiments of the disclosure, when the IoT menu is displayed at a designated position, the contour boundary of the image of the second device 210 displayed on the first device 200 may be recognized, and the IoT menu of the second device is preferably displayed outside the contour boundary of the image of the second device, thus not affecting the viewing of the image of the second device.

According to various embodiments of the disclosure, at operation 303, after receiving a request by the user for selecting any menu option in the IoT menu, the first device sends the request to the second device such that the second device performs related operations according to the request.

According to various embodiments of the disclosure, any menu option may also be selected by voice or touch. If the first device is a pair of glasses, the touch control may be performed through virtual gestures and the like.

Figure 6:
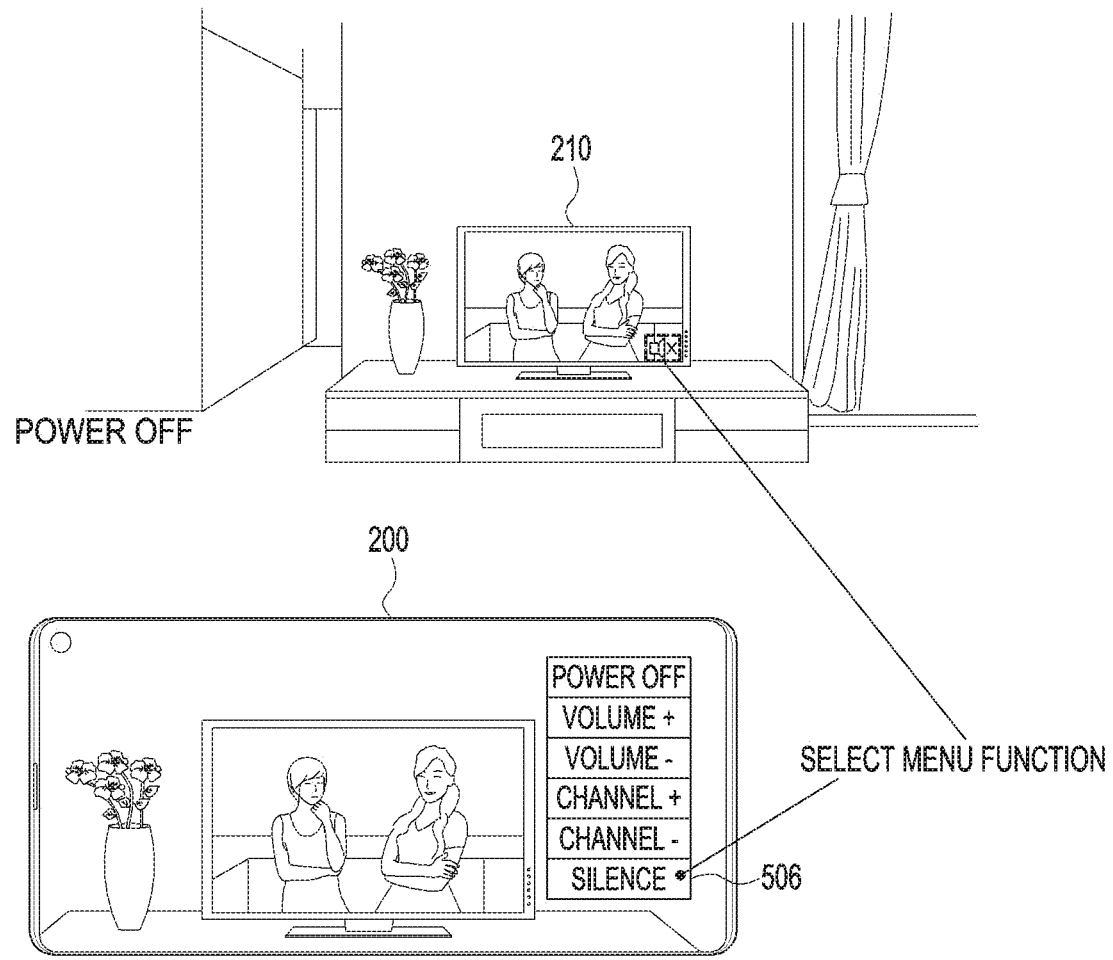
FIG. 6 is a diagram of selecting a mute function in an IoT menu of the second device according to an embodiment of the disclosure.

FIG. 6 is a diagram of selecting a mute menu in an IoT menu of a second device according to an embodiment of the disclosure.

Referring to FIG. 6, after receiving a request for "silence" input by a user, the first device 200 (e.g., a mobile phone) sends the request to the second device 210 (e.g., a television set), and the second device 210 mutes the television set as if it received a request for "mute" function from a remote controller.

Based on the above description, the first device 200 may control the second device 210 to perform the functional operation of the second device 210. The user may control the second device 210 in different places in a room, such as controlling a speaker to play music.

Third Embodiment

In this embodiment, a process of at least one device assisting other devices to establish a connection is taken as an example.

Figure 7:
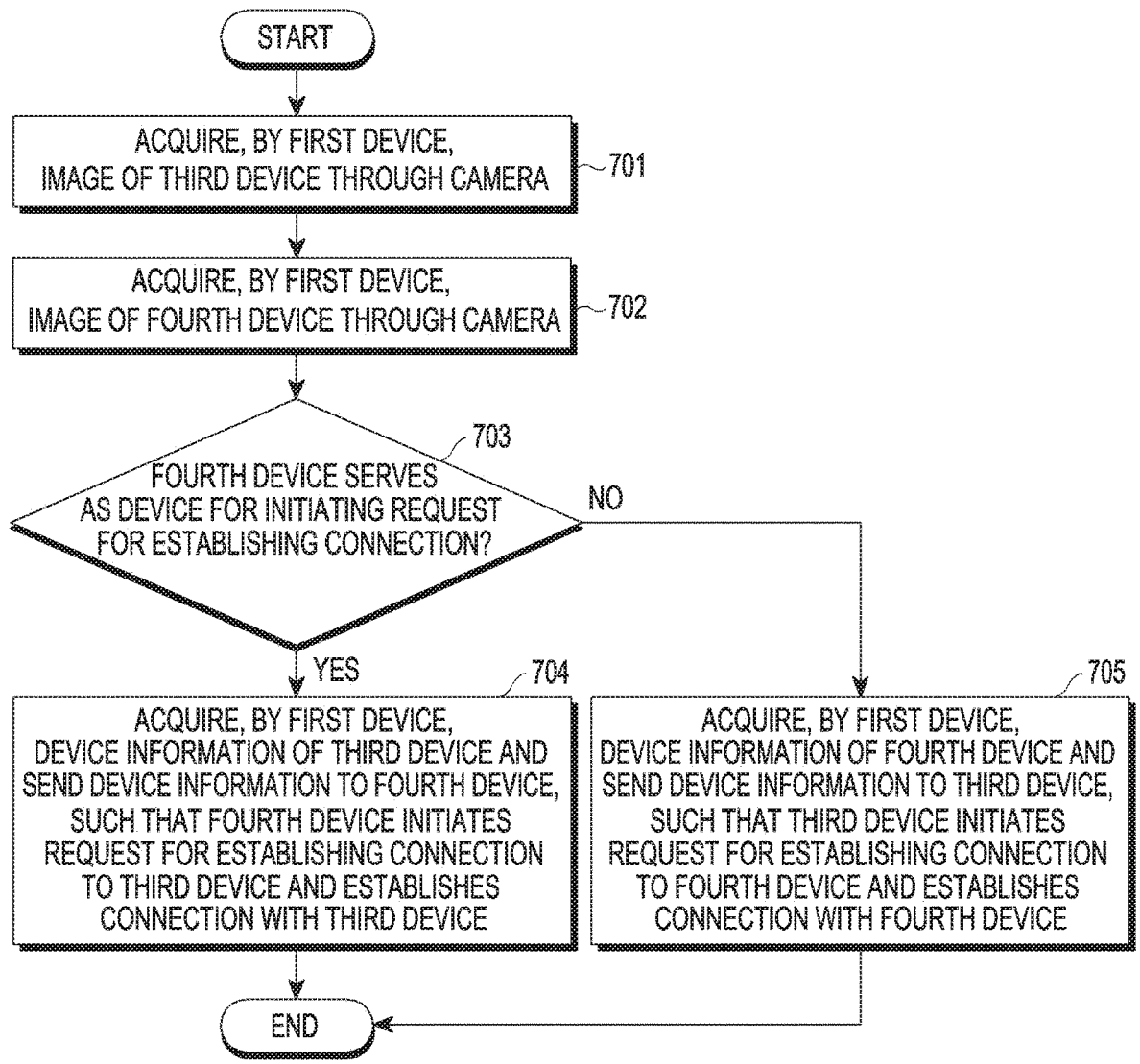
FIG. 7 is a flowchart of establishing a device connection according to an embodiment of the disclosure.

FIG. 7 is a flowchart of establishing a connection between devices according to an embodiment of the disclosure.

Referring to FIG. 7, according to various embodiments of the disclosure, at operation 701, the first device (e.g., the first device 200 of FIG. 1) recognizes a type of a third device 800 through a camera. The first device 200 recognizes a type of the third device 800 through the acquired image. The first device 200 acquires a device list corresponding to the type of the third device 800 through an IoT server and identifies the third device 800 in the device list.

According to various embodiments of the disclosure, at operation 702, the first device 200 captures an image of a fourth device 810 through the camera. The first device 200 recognizes a type of the fourth device 810 through the acquired image, acquires a device list corresponding to the type of the fourth device 810 through an IoT server, and identifies the fourth device 810 in the device list.

In the specific implementation of the embodiment of the disclosure, operation 701 and operation 702 are in no particular order. The specific implementation of operation 701 and operation 702 may refer to the specific implementation of operations 101 to 103.

In this embodiment, the first device 200 in this example is a pair of glasses.

Figure 8:
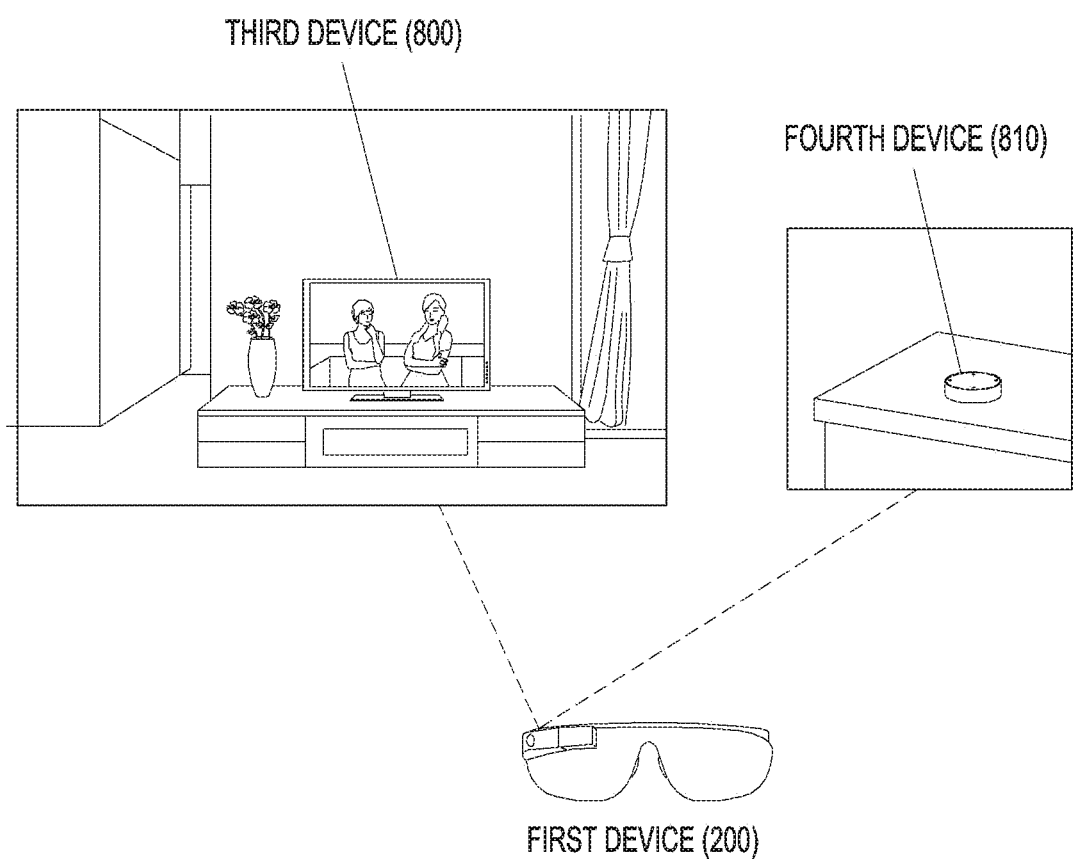
FIG. 8 is a diagram of establishing a device connection with a pair of glasses according to an embodiment of the disclosure.

FIG. 8 is a diagram of establishing a connection between devices with a pair of glasses according to an embodiment of the disclosure.

Referring to FIG. 8, the process of acquiring an image with glasses is similar to the implementation of a mobile terminal, except that the image or menu is displayed through a virtual screen. The input of instructions may be implemented through virtual gestures or voice.

Referring to FIG. 8, according to various embodiments of the disclosure, in this embodiment, the process of identifying the third device 800 and the fourth device 810 in the device list in this embodiment is similar to the process of identifying the second device 210 in the first embodiment.

According to various embodiments of the disclosure, at operation 703, the first device 200 determines whether the fourth device 810 initiates a request for establishing connection. If the fourth device 810 initiates the request for establishing connection, operation 704 is performed. Otherwise, operation 705 is performed.

According to various embodiments of the disclosure, at operation 704, the first device 200 acquires the device information of the third device 800 and sends the device information to the fourth device 810. Using the device information, the fourth device 810 initiates a connection request for establishing a connection to the third device 800 and establishes a connection with the third device 800.

According to various embodiments of the disclosure, at operation 705, the first device 200 acquires the device information of the fourth device 810 and sends the device information to the third device 800. Using the device information, the third device 800 initiates a connection request for establishing a connection to the fourth device 810 and establishes a connection with the fourth device 810.

According to various embodiments of the disclosure, the device information of the third device 800 or the fourth device 810, which are acquired by the first device 200, may be a unique identifier of the third device 800 or the fourth device 810 in the current IoT environment, such that the device that initiates the establishment of connection may initiate a request to the peer device.

According to various embodiments of the disclosure, the third device 800 or the fourth device 810 acquires the related information of the peer device. The process of connection is similar to the existing implementation. In this embodiment, the user is not required to manually select the target device in the list and is very convenient to establish a connection between devices without a display or with a display that is too small.

Fourth Embodiment

The fourth embodiment provides a process of viewing the state of the IoT device.

Figure 9:
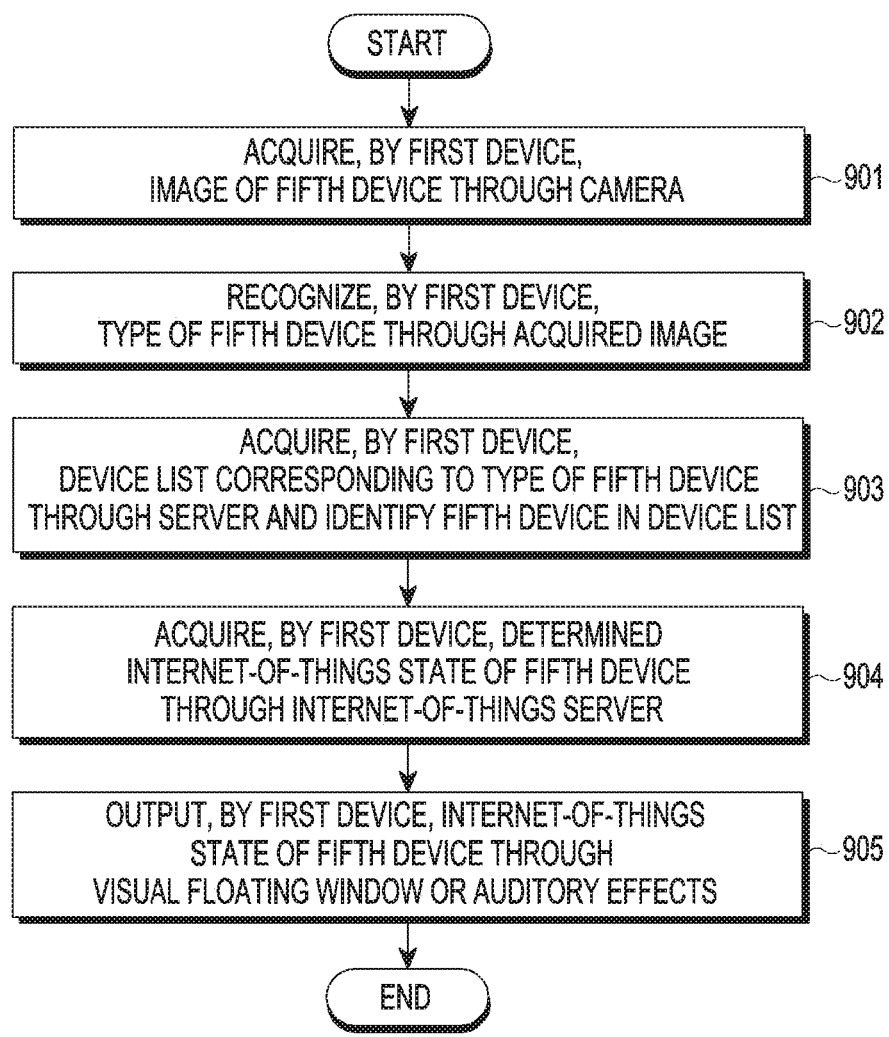
FIG. 9 is a flowchart of displaying an IoT state of devices according to an embodiment of the disclosure.

FIG. 9 is a flowchart of displaying an IoT state of devices according to an embodiment of the disclosure.

Referring to FIG. 9, according to various embodiments of the disclosure, at operation 901, the first device 200 captures an image of a fifth device through the camera.

According to various embodiments of the disclosure, at operation 902, the first device 200 recognizes a type of the fifth device through the acquired image.

According to various embodiments of the disclosure, at operation 903, the first device 200 acquires a device list corresponding to the type of the fifth device through the IoT server and identifies the fifth device in the device list.

According to various embodiments of the disclosure, the implementation process of operations 901 to 903 is similar to the implementation process of operations 101 to 103, which will not be described here in detail.

According to various embodiments of the disclosure, at operation 904, the first device 200 acquires an IoT state of the identified fifth device through the IoT server.

After each device is connected to another device, the other device is recorded in the IoT server. And the other device may be recorded in a device list or may be separately stored. At operation 905, the first device 200 outputs the IoT state of the fifth device through a visual floating window or auditory effects.

According to various embodiments of the disclosure, the IoT states of the device include connected and unconnected states. In this operation, when the IoT state of the fifth device is displayed through the visual floating window, the unconnected state may not be identified, or may be identified by a text, or may also be identified by a certain predetermined shape, such as a rectangular frame, a circle or the like.

According to various embodiments of the disclosure, when the unconnected state is displayed, it may be displayed without limitation, or may be displayed in such a manner as not to block the position of the image of the fifth device. For example, the unconnected state is displayed at a position other than the image of the fifth device.

Figure 10:
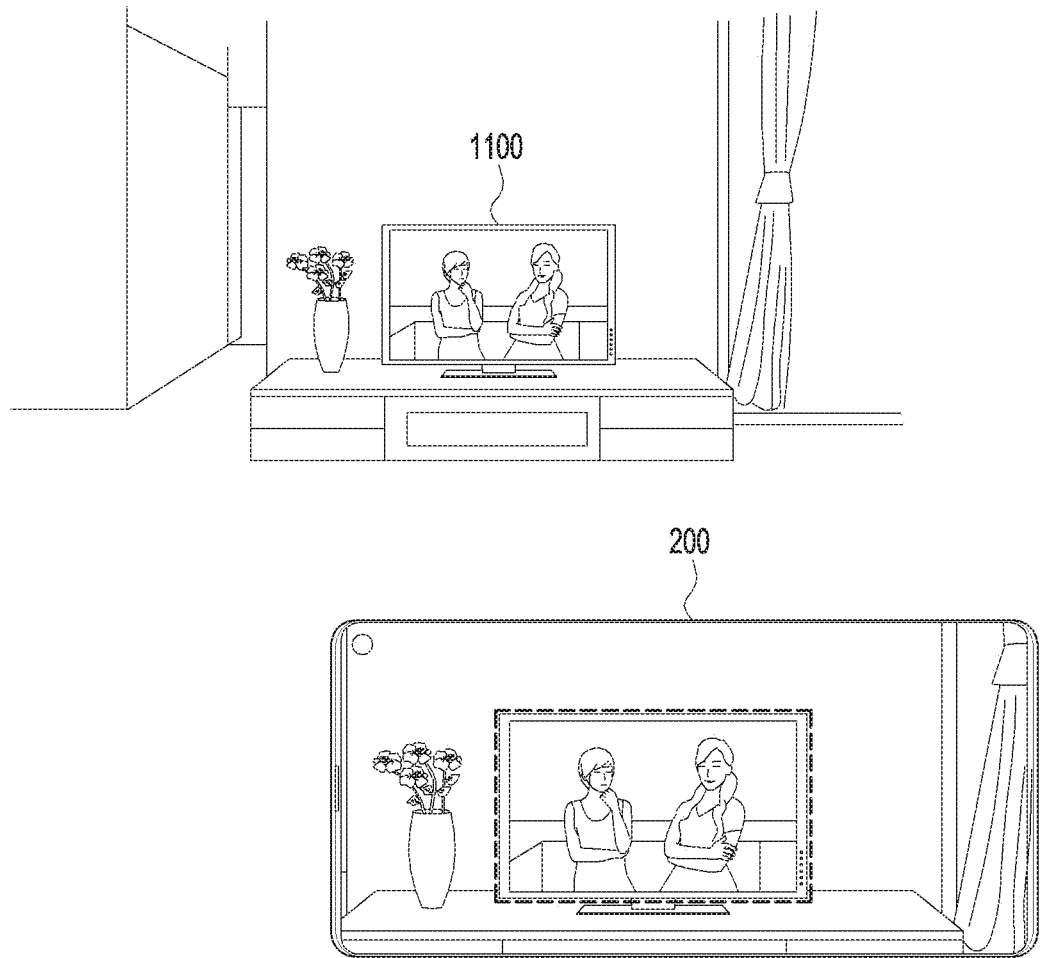
FIG. 10 is a diagram of displaying an unconnected state according to an embodiment of the disclosure.

FIG. 10 is a diagram of displaying an unconnected state according to an embodiment of the disclosure.

Referring to FIG. 10, for the IoT state of the fifth device, an unconnected state is identified with a dashed box displayed outside the contour boundary, but various embodiments of the disclosure are not limited thereto.

According to various embodiments of the disclosure, a connected state may be identified by text or may be identified by a certain predetermined shape, and only needs to be distinguished from the unconnected state.

According to various embodiments of the disclosure, when the connected state is displayed, it may be displayed without limited, or may be limited to be displayed at a position outside the image of the fifth device, in such a manner as not to block the fifth device.

According to various embodiments of the disclosure, for the connected state, a list of the devices connected to the fifth device is also acquired through the IoT server, and displayed in the form of a floating menu at a position other than the position of the image of the fifth device. The connected device may be displayed by name when displayed, or the unique identifier of the device may be displayed, for the purpose that the user may sure the connected devices.

Figure 11:
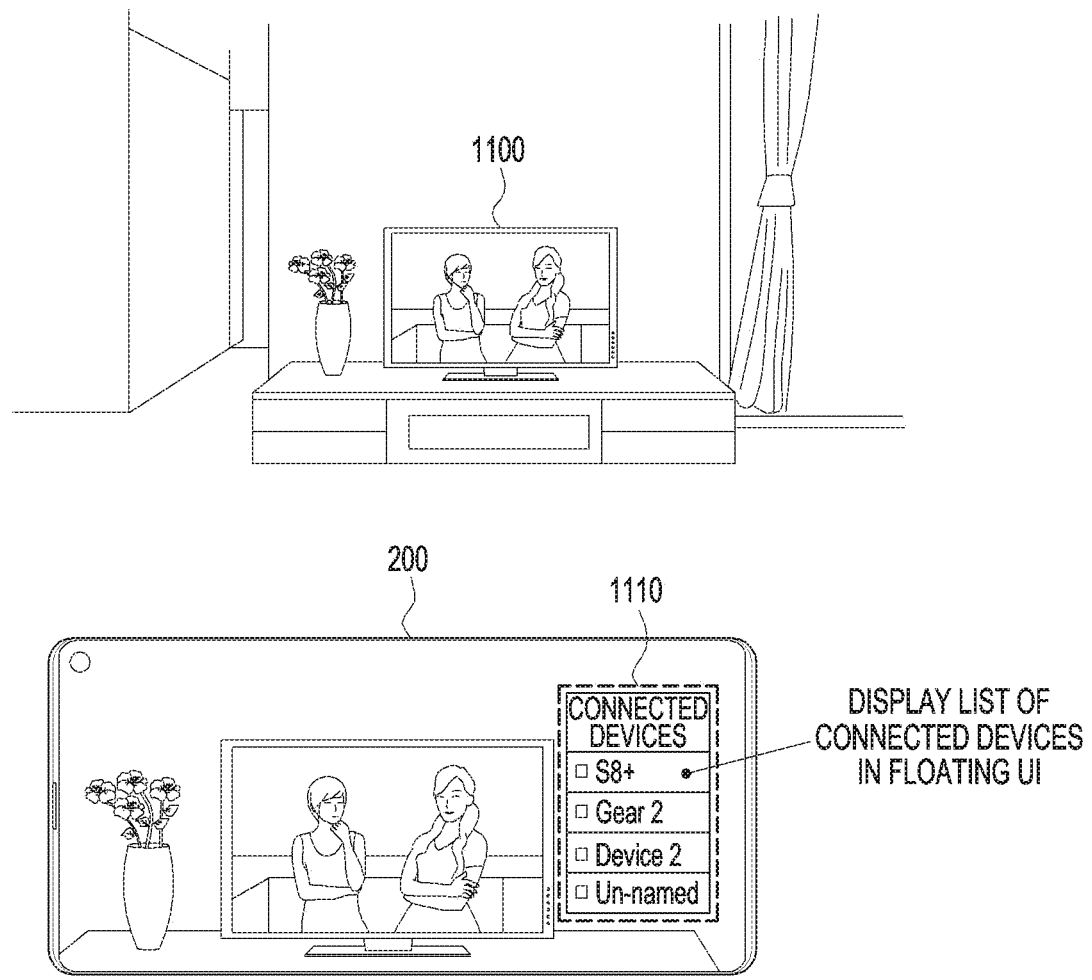
FIG. 11 is a diagram of displaying a connected state in according to an embodiment of the disclosure.

FIG. 11 is a diagram of displaying a connected state according to an embodiment of the disclosure.

Referring to FIG. 11, for the IoT state of the fifth device 1100, a connected state is identified with a solid box displayed outside the contour boundary, but various embodiments of the disclosure are not limited thereto. In particular, the device list 1110 of the connected devices, specifically including Samsung® Galaxy™ S8+, Samsung® Gear2, Device2 and unnamed, is displayed outside the image of the fifth device. Herein, "connected devices" mean devices that are currently in a connected state or have ever been connected.

Referring to FIG. 11, in the embodiment of the disclosure, the first device 200 with a camera captures and recognizes other smart devices (the second device 210, the third device 800, the fourth device 810, and the fifth device 1100) in the current IoT environment through the camera, such that the first device 200 may quickly establish a connection with the devices (the second device 210, the third device 800, the fourth device 810, and the fifth device 1100); or quickly establish a connection between the devices (the second device 210, the third device 800, the fourth device 810, and the fifth device 1100). And, the state of the devices (the second device 210, the third device 800, the fourth device 810, and the fifth device 1100) and an operation menu are displayed on the picture captured through the camera of the first device in augmented reality.

According to various embodiments of the disclosure, the operation intervention by a user during the interconnection of devices is minimized in the disclosure. The intention of the user is intelligently recognized and automatically executed (the establishment of a connection), and a user interface (UI) operation interface of augmented reality and the identification information of devices are provided.

The disclosure further proposes an apparatus for establishing device connection, which is implemented by the first device 200 with a camera.

Figure 12:
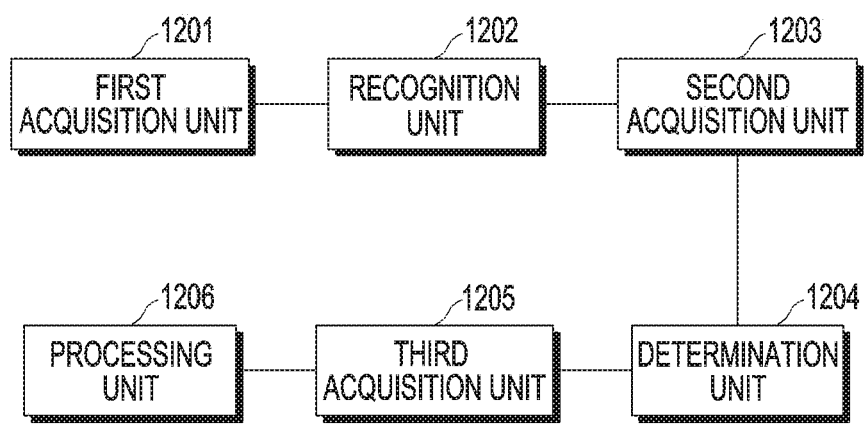
FIG. 12 is a diagram of the structure of an apparatus according to an embodiment of the disclosure.

FIG. 12 is a diagram of an apparatus according to an embodiment of the disclosure.

Referring to FIG. 12, the apparatus includes a first acquisition unit 1201, a recognition unit 1202, a second acquisition unit 1203, a determination unit 1204, a third acquisition unit 1205 and a processing unit 1206. At least one operation performed by the units 1201 through 1206 according to various embodiments of the disclosure may be performed by at least one processor 1320.

Referring to FIG. 12, according to various embodiments of the disclosure, the first acquisition unit 1201 is configured to acquire an image of a second device through the camera.

According to various embodiments of the disclosure, the recognition unit 1202 is configured to recognize the type of the second device through the image of the second device acquired by the first acquisition unit 1201.

According to various embodiments of the disclosure, the second acquisition unit 1203 is configured to acquire, through an IoT server, a device list corresponding to the type of the second device recognized by the recognition unit 1202.

According to various embodiments of the disclosure, the determination unit 1204 is configured to identify the second device in the device list acquired by the second acquisition unit 1203.

According to various embodiments of the disclosure, the third acquisition unit 1205 is configured to acquire a unique identifier of the second device in the current IoT environment determined by the determination unit 1204.

According to various embodiments of the disclosure, the processing unit 1206 is configured to use the unique identifier of the second device acquired by the third acquisition unit 1205 to initiate a connection request to the second device to establish a connection with the second device.

According to various embodiments of the disclosure, the processing unit 1206 is further configured to, if the second acquisition unit 1203 does not acquire the device list corresponding to the type of the second device through the IoT server, notify the IoT server to establish a device list corresponding to the type of the second device, and add the feature information corresponding to the second device.

According to various embodiments of the disclosure, the determination unit 1204 is specifically configured to, after the second device is determined in the device list, recognize the feature information of the second device according to the acquired image of the second device, and use the feature information of the second device to match with the feature information corresponding to each unique identifier in the device list; and if there is the feature information that matches with the feature information of the second device, determine the device identified by the unique identifier corresponding to the matched feature information as the second device.

According to various embodiments of the disclosure, the processing unit 1206 is further configured to, if the determination unit 1204 determines that there is no feature information that matches with the feature information of the second device, notify the IoT server to assign a unique identifier to the device in the device list, and add the corresponding feature information.

According to various embodiments of the disclosure, the first acquisition unit 1201 is further configured to, after the image of the second device is acquired through the camera, display the image on a screen; and the processing unit 1206 is further configured to, if the number of the displayed IoT devices displayed by the first acquisition unit 1201 is greater than 1, after an instruction input by a user to select any of the IoT devices is received, recognize the selected IoT object as the target device to be recognized.

According to various embodiments of the disclosure, the first acquisition unit 1201 is further configured to acquire an image of a third device through the camera; and acquire an image of a fourth device through the camera; the recognition unit 1202 is further configured to recognize the type of the third device through the image acquired by the first acquisition unit 1201; and recognize the type of the fourth device through the acquired image; and the second acquisition unit 1203 is further configured to acquire a device list corresponding to the type of the third device through the IoT server; and acquire a device list corresponding to the type of the fourth device through the IoT device; the determination unit 1204 is further configured to determine the third device in the device list corresponding to the type of the third device acquired by second acquisition unit 1203; determine the fourth device in the acquired device list corresponding to the type of the fourth device; and determine whether the fourth device serves as a device that initiates a request for establishing a connection; and the processing unit 1206 is further configured to, if the determination unit 1204 determines that the fourth device serves as a device that initiates a request for establishing a connection, acquire the device information of the third device and send the device information to the fourth device, such that the fourth device initiates a request for establishing a connection to the third device and establishes a connection with the third device.

According to various embodiments of the disclosure, the processing unit 1206 is further configured to, after receiving a request input by the user to acquire an IoT menu of the second device, send a request for acquiring an IoT menu of the second device to the second device; after receiving an IoT menu sent by the second device, display the IoT menu in a visual floating window; and after receiving a request by the user for selecting any menu option in the IoT menu, send the request to the second device such that the second device performs related operations according to the request.

According to various embodiments of the disclosure, the first acquisition unit 1201 is configured to acquire an image of a fifth device through the camera; the recognition unit 1202 is configured to recognize the type of the fifth device through the image of the fifth device acquired by the first acquisition unit 1201; the second acquisition unit 1203 is configured to acquire, through an IoT server, a device list corresponding to the type of the fifth device recognized by the recognition unit 1202; the determination unit 1204 is configured to identify the fifth device in the device list acquired by the second acquisition unit 1203; the third acquisition unit is configured to, through the IoT server, acquire the IoT state of the fifth device determined by the determination unit 1204; and the processing unit 1206 is further configured to display, through a visual floating window, the IoT state of the fifth device acquired by the third acquisition unit 1205.

According to various embodiments of the disclosure, the processing unit 1206 is further configured to, when the IoT state of the fifth device is displayed through the visual floating window, display the IoT state in such a way as not to block the position of the image of the fifth device.

According to various embodiments of the disclosure, the third acquisition unit 1205 is further configured to, if the IoT state of the fifth device determined by the determination unit 1204 is a connected state, acquire a list of the devices connected to the fifth device through the IoT server, and trigger the processing unit 1206 to display the list in the form of a floating menu at a position other than the position of the image of the fifth device.

According to various embodiments of the disclosure, the above units in the embodiment may be integrated into one or may be deployed separately; or may be combined into one unit, or may be further split into multiple sub-units.

According to various embodiments of the disclosure, in the disclosure, a first device with a camera captures and recognizes other smart devices (a second device, a third device, a fourth device, a fifth device, . . . ) in the current IoT environment through the camera, such that the first device may quickly establish a connection with the devices (the second device, the third device, the fourth device, the fifth device, . . . ); or quickly establish a connection between the devices (the second device, the third device, the fourth device, the fifth device, . . . ). Also, the state of the devices (the second device, the third device, the fourth device, the fifth device . . . ) and an operation menu are displayed on the picture captured through the camera of the first device in augmented reality.

The disclosure that minimizes the operation intervention by a user during the interconnection of devices is implemented in the disclosure. The intention of the user is intelligently recognized and automatically executed (the establishment of a connection) in the disclosure. A UI operation interface of augmented reality and the identification information of devices are provided in the disclosure.

Figure 13:
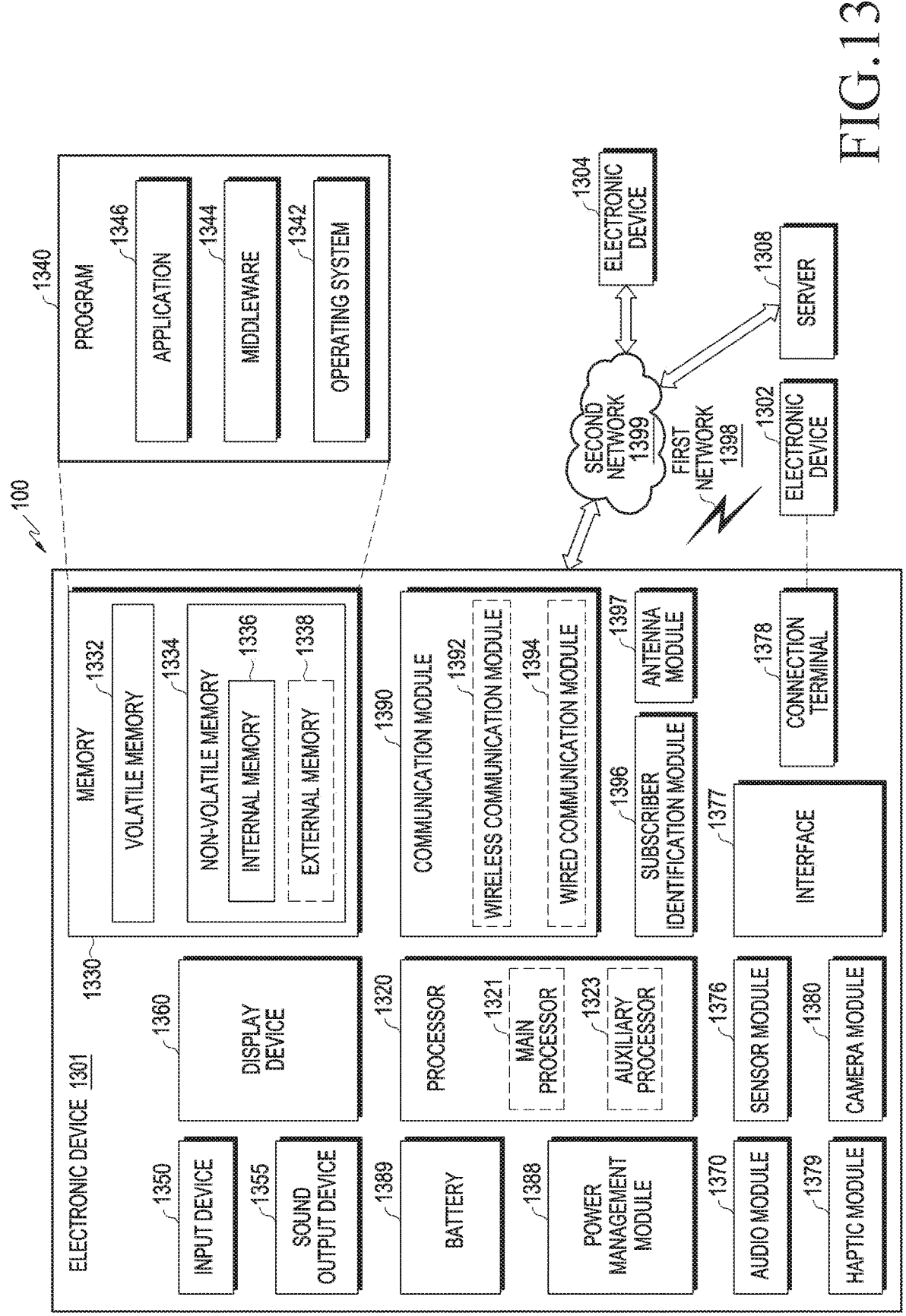
FIG. 13 is a block diagram of a device in a network environment according to an embodiment of the disclosure.

FIG. 13 is a block diagram illustrating a device 1301 in a network environment 1300 according to various embodiments.

Referring to FIG. 13, the device 1301 (e.g., first through fifth devices) in the network environment 1300 may communicate with a device 1302 via a first network 1398 (e.g., a short-range wireless communication network), or a device 1304 or a server 1308 via a second network 1399 (e.g., a long-range wireless communication network). According to an embodiment, the device 1301 may communicate with the device 1304 via the server 1308. According to an embodiment, the device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the device 1301, or other components may be added in the device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321. At least one operation or function according to various embodiments of the disclosure may be performed by the processor 1320.

The auxiliary processor 1323 may control at least some of functions or states related to at least one (e.g., the display device 1360, the sensor module 1376, or the communication module 1390) of the components of the device 1301, instead of the main processor 1321 while the main processor 1321 is in an inactive (e.g., sleep) state or along with the main processor 1321 while the main processor 1321 is an active state (e.g., performing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the device 1301, from the outside (e.g., a user) of the device 1301. The input device 1350 may include, for example, a microphone, a mouse, a keyboard, or a pen input device (e.g., a stylus pen).

The sound output device 1355 may output sound signals to the outside of the device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., the device 1302) directly or wirelessly coupled with the device 1301.

The sensor module 1376 may detect an operational state (e.g., power or temperature) of the device 1301 or an environmental state (e.g., a state of a user) external to the device 101, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the device 1301 to be coupled with the external electronic device (e.g., the device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connection terminal 1378 may include a connector via which the electronic device 1301 may be physically connected with the external electronic device (e.g., the device 1302). According to an embodiment, the connection terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or motion) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the device 1301. According to one embodiment, the power management module 1388 may be implemented as at least part of, for example, a power management integrated circuit (PMIC).

The battery 1389 may supply power to at least one component of the device 1301. According to an embodiment, the battery 1389 may include, for example, a primary cell which is not rechargeable, a secondary cell which is rechargeable, or a fuel cell.

The communication module 1390 may support establishing a wired or wireless communication channel between the electronic device 1301 and an external electronic device (e.g., the device 1302, the device 1304, or the server 1308) and performing communication through the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)) These various types of communication modules may be implemented as a single component (e.g., a single chip), or may be implemented as multi components (e.g., multi chips) separate from each other. The wireless communication module 1392 may identify and authenticate the device 1301 in a communication network, such as the first network 1398 or the second network 1399, using subscriber information (e.g., international mobile subscriber identity (IMSI)) stored in the SIM 1396.

The antenna module 1397 may transmit or receive a signal or power to or from the outside (e.g., the external device). According to an embodiment, the antenna module 1397 may include one or more antennas including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiments of the disclosure, commands or data may be transmitted or received between the device 1301 and the external device 1304 via the server 1308 coupled with the second network 1399. Each of the device 1302 and the device 1304 may be a device of the same type as or a different type than the device 1301. According to an embodiment, all or some of operations to be executed at the device 1301 may be executed at one or more of the external devices 1302, 1304, or 1308. For example, if the device 1301 should perform a function or a service automatically, or in response to a request from a user or another device, the device 1301, instead of, or in addition to, executing the function or the service, may request the one or more external electronic devices to perform at least part of the function or the service. The one or more external devices receiving the request may perform the at least part of the function or the service requested, or an additional function or an additional service related to the request, and transfer an outcome of the performing to the device 1301. The device 1301 may provide the outcome, with or without further processing of the outcome, as at least part of a reply to the request. To that end, a cloud computing, distributed computing, or client-server computing technology may be used, for example.

The device according to various embodiments of the disclosure may be one of various types of devices. The devices may include, for example, a portable communication device (e.g., a smartphone), a computer device, a portable multimedia device, a portable medical device, a camera, a wearable device, or a home appliance. According to an embodiment of the disclosure, the devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" or "unit" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments of the disclosure, the disclosure provides a method and apparatus for establishing a device connection, which can automatically establish a connection between devices with less operation on the devices.

Effects according to various embodiments are not limited to the described effects, and it would be obvious to those of ordinary skill in the art that various effects are included in the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for establishing a device connection by a first device, the method comprising:
   acquiring a first image of a second device using a camera of the first device;
   recognizing a first type of the second device and first feature information associated with the second device based on the first image;

transmitting a first request for a first device list based on the first type of the second device from an internet of things (IoT) server;
in case that the first device list is stored by the IoT server, receiving the first device list;
identifying a first unique identifier of the second device in the first device list based on the first feature information associated with the second device;
transmitting a second request to establish a connection with the second device based on the first unique identifier of the second device;
acquiring a second image of a third device using the camera;
recognizing a second type of the third device and second feature information associated with the third device based on the second image;
receiving a second device list based on the second type of the third device from the IoT server;
identifying a second unique identifier of the third device in the second device list based on the second feature information associated with the third device;
determining whether the third device initiates a request for establishing connection with the second device;
in case that the third device is determined to initiate the request for establishing the connection, transmitting first device information of the second device to the third device for establishing the connection with the second device; and
in case that the third device is not determined to initiate the request for establishing the connection, transmitting second device information of the third device to the second device for establishing a second connection with the third device,
wherein the second device information of the third device includes the second unique identifier of the third device, and
wherein the first device information of the third device includes the first unique identifier of the second device.

2. The method of claim 1, further comprising:
when the first device list is not stored by the IoT server, transmitting a third request for setting the first device list to the IoT server,
wherein the third request includes the first type of the second device and the first feature information associated with the second device.

3. The method of claim 1, wherein the identifying of the first unique identifier of the second device comprises:
determining whether the first feature information associated with the second device is matched with a first item in the first device list; and
determining a unique identifier of the first item as the first unique identifier of the second device when the first feature information associated with the second device is matched with the first item in the first device list.

4. The method of claim 3, further comprising:
when no item in the first device list matches with the first feature information of the second device, transmitting a fourth request for adding the second device into the first device list to the IoT server, wherein the fourth request includes the first feature information of the second device.

5. The method of claim 1, further comprising:
displaying the first image on a screen of the first device;
determining a number of IoT devices in the first image; and
receiving a first input selecting the second device from among the number of the IoT devices.

6. The method of claim 1, further comprising:
receiving a second input for acquiring a menu of commands for the second device;
in response to the second input, transmitting a fourth request to the second device for the menu of commands;
receiving and displaying the menu of commands in a floating window; and
when a third input of a command on the menu is received, transmitting a fifth request to the second device to perform the command.

7. The method of claim 1, further comprising:
acquiring a fourth image of a fifth device using the camera;
displaying the fourth image, wherein the fifth device is displayed in a first region;
recognizing a fourth type of the fifth device and fourth feature information associated with the fifth device based on the fourth image;
receiving a fourth device list based on the fourth type of the fifth device from the IoT server;
identifying a fourth unique identifier of the fifth device in the fourth device list based on the fourth feature information associated with the fifth device;
receiving information including an IoT state of the fifth device from the IoT server; and
displaying the IoT state of the fifth device through a floating window.

8. The method of claim 7, wherein the floating window is displayed in a second region that is different from the first region.

9. The method of claim 7, further comprising:
when the IoT state corresponds to a connected state, requesting a list of devices connected to the fifth device from the IoT server; and
displaying a floating menu including the list of devices in a second region that is different from the first region.

10. A device comprising:
at least one camera;
a touch screen display;
a transceiver; and
at least one processor,
wherein the at least one processor is configured to:
acquire a first image of a second device through the at least one camera,
recognize a first type of the second device and first feature information associated with the second device based on the first image,
control the transceiver to transmit a first request for a first device list based on the first type of the second device from an internet of things (IoT) server,
in case that the first device list is stored by the IoT server, control the transceiver to receive the first device list,
identify a first unique identifier of the second device in the first device list based on the first feature information associated with the second device,
control the transceiver to transmit a second request to establish a connection with the second device based on the first unique identifier of the second device,
acquire a second image of a third device using the camera,
recognize a second type of the third device and second feature information associated with the third device based on the second image, control the transceiver to receive a second device list based on the second type of the third device from the IoT server, identify a second unique identifier of the third device in the second device list based on the second feature information associated with the third device, determine whether the third device initiates a request for establishing connection with the second device, in case that the third device is determined to initiate the request for establishing the connection, control the transceiver to transmit first device information of the second device to the third device for establishing the connection with the second device, and in case that the third device is not determined to initiate the request for establishing the connection, control the transceiver to transmit second device information of the third device to the second device for establishing a second connection with the third device, wherein the second device information of the third device includes the second unique identifier of the third device, and wherein the first device information of the third device includes the first unique identifier of the second device.

11. The device of claim 10,
wherein the at least one processor is further configured to:
when the first device list is not stored by the IoT server, control the transceiver to transmit a third request for setting the first device list to the IoT server, and
wherein the third request includes the first type of the second device and the first feature information associated with the second device.

12. The device of claim 10, wherein the at least one processor is further configured to:
determine whether the first feature information associated with the second device is matched with a first item in the first device list, and
determine a unique identifier of the first item as the first unique identifier of the second device when the first feature information associated with the second device is matched with the first item in the first device list.

13. The device of claim 12, wherein, when no item in the first device list matches with the first feature information of the second device, the at least one processor is further configured to control the transceiver to transmit a fourth request for adding the second device into the first device list to the IoT server, and
wherein the fourth request includes the first feature information of the second device.

14. The device of claim 10, wherein the at least one processor is further configured to:
display the first image on the touch screen display,
determine a number of IoT devices in the first image, and
receive a first input selecting the second device from among the number of the IoT devices.

15. The device of claim 10, wherein the at least one processor is further configured to:
receive a second input for acquiring a menu of commands for the second device,
in response to the second input, control the transceiver to transmit a fourth request to the second device for the menu of commands,
control the transceiver to receive the menu of commands,
display the menu of commands in a floating window on the touch screen display, and
when a third input of a command on the menu is received, control the transceiver to transmit a fifth request to the second device to perform the command.

16. The device of claim 10, wherein the at least one processor is further configured to:
acquire a fourth image of a fifth device using the at least one camera,
display the fourth image on the touch screen display, wherein the fifth device is displayed in a first region,
recognize a fourth type of the fifth device and fourth feature information associated with the fifth device based on the fourth image,
control the transceiver to receive a fourth device list based on the fourth type of the fifth device from the IoT server,
identify a fourth unique identifier of the fifth device in the fourth device list based on the fourth feature information associated with the fifth device,
control the transceiver to receive information including an IoT state of the fifth device from the IoT server, and
display the IoT state of the fifth device through a floating window on the touch screen display.

17. The device of claim 16, wherein the floating window is displayed in a second region that is different from the first region.

18. The device of claim 16, wherein the at least one processor is further configured to:
when the IoT state corresponds to a connected state, request a list of devices connected to the fifth device from the IoT server, and
display a floating menu including the list of devices in a second region that is different from the first region.

* * * * *